Aug. 25, 1970   H. B. MOORS ET AL   3,525,194
METHOD FOR PRODUCING READILY OPENABLE PLASTIC COATED CONTAINERS
Filed Oct. 11, 1967   2 Sheets-Sheet 2

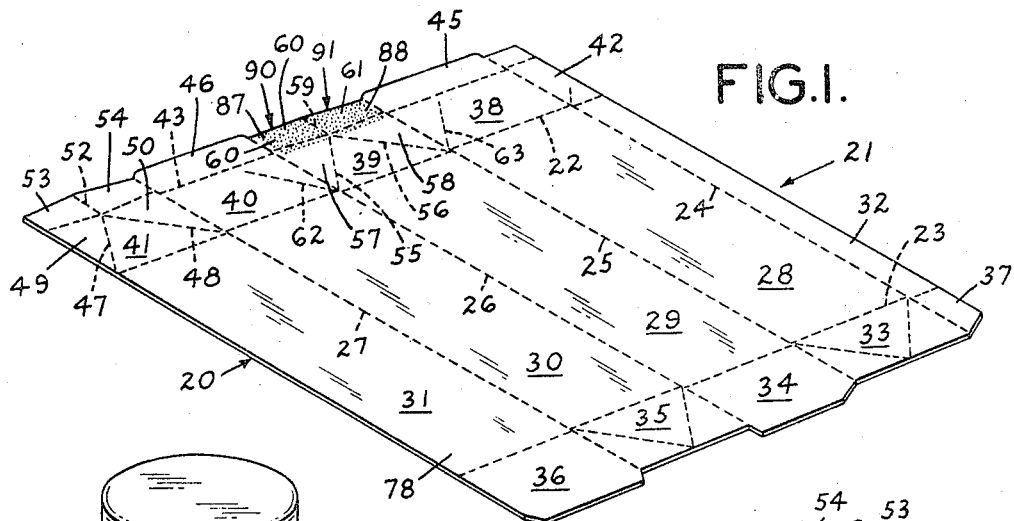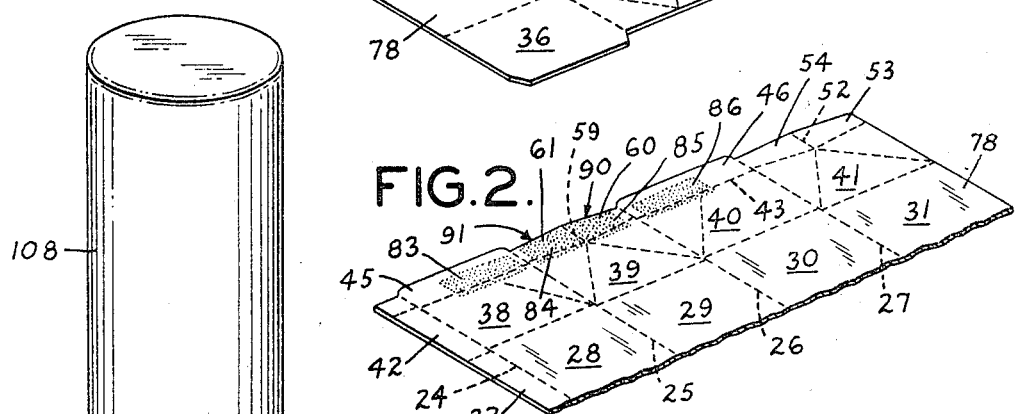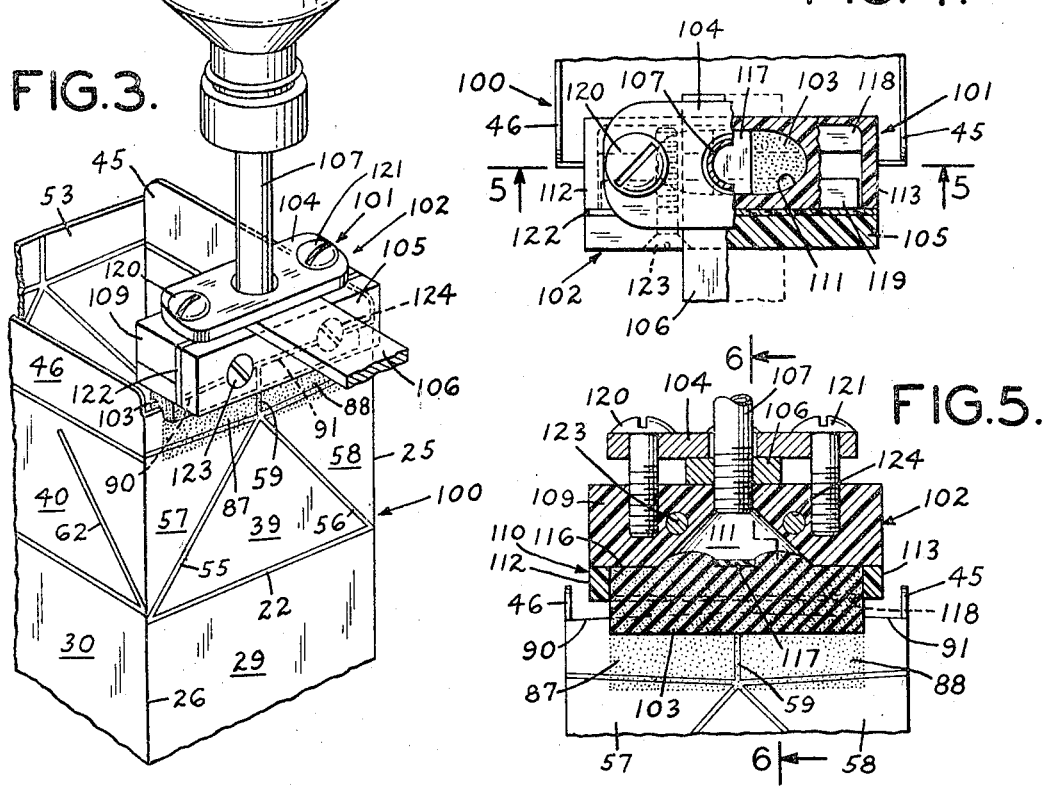

3,525,194
METHOD FOR PRODUCING READILY OPENABLE PLASTIC COATED CONTAINERS
Harold B. Moors, Richboro, Pa., and Frederick E. Bichaylo, Marlton, N.J., assignors to International Paper Company, New York, N.Y., a corporation of New York
Filed Oct. 11, 1967, Ser. No. 674,458
Int. Cl. B65b 7/18
U.S. Cl. 53—37      8 Claims

ABSTRACT OF THE DISCLOSURE

The major portion of the raw edge (and adjacent areas) of the pouring spout of a plastic coated gable-top container is wet prior to heat sealing of the gable top and then the gable top is heat sealed to effect a liquid tight container closure. The wetting material, all or most of which should be a volatile liquid, coats the raw edge and penetrates the fibers of the coated stock. A wetting agent and/or a thickening agent is used to achieve wetting and to provide a coating of the wetting material on the raw edge and adjacent areas. The heat sealing step is performed promptly to avoid substantial loss of wetting material from the raw edge. The apparatus contacts the raw edge with a liquid carrying member, e.g., a suitable sponge, which transfers the wetting material to the raw edge without dripping of wetting material into the container.

BACKGROUND OF THE INVENTION

The present invention relates to the sealing of plastic coated containers and especially to such containers of the gable-top type which are to be heat sealed and which, when subsequently opened, afford a pouring spout.

A particularly good example of such a gable-top plastic coated container is found in U.S. Pat. 3,292,842 which issued to Huang and Moors on Dec. 20, 1966. Such containers are used in large quantities and are usually made from paperboard coated on both surfaces with polyethylene. A major advantage achieved by using containers made from paperboard coated with polyethylene or other heat sealable plastic is that such containers can readily be sealed against leakage by application of heat to polyethylene surfaces that are to be joined together, the heat acting to soften the polyethylene whereby when two strips of softened polyethylene are pressed together a liquid-tight seal is formed.

One major difficulty which has been encountered in using polyethylene coated containers, especially when used for beverages, is that the bond between heat-sealed surfaces is so strong that, when an effort is made to open the container by pulling apart two or more such surfaces, the polyethylene will be pulled away from the paper backing on one or the other of the surfaces, exposing a roughened paper surface to the action of liquid as the container is used. Action of liquid on the paper soon produces an unsightly and unsanitary condition which is particularly undesirable where a container is to be opened and tilted repeatedly in dispensing the contents, as in the case of milk containers.

In making polyethylene coated paper milk cartons, heat-sealing is usually effected over limited areas in a definite complicated pattern to yield an operable pouring spout. However, practical production problems prevent limitation of the heat-sealing to only those areas which must be sealed for a liquid-tight container, and it is the additional areas which are undesirably heat-sealed which cause the greatest problem when the spout is opened for dispensing liquid from the container.

The container of the aforementioned Huang and Moors patent greatly minimizes the opening problem by providing an abhesive coating on selected areas of the container pouring spout. Nevertheless, the container is sometimes not as easy to open as might be desired. Indeed, in some cases, the container may prove difficult to open. The ease of opening or "top opening quality" of such a container is dependent on a number of factors. The most important of these are the quality, film thickness, and film uniformity of the abhesive material used to effect good release, and the filling machine conditions of top heater temperature, sealer jaw pressure, and the "plowing" action of the sealer jaws on the carton spout as it enters the top sealer area. A poor quality abhesive application and/or high top heater temperatures and "plowing" pressures exerted on the top of the carton during top closure, result in sticking of the spout end rib panels to the gabled roof rib panels, especially at the spout rib panel raw edge, resulting in difficulty in top opening for the consumer.

The principal object of the present invention has been to provide a method and apparatus for sealing plastic coated containers which will render such containers readily openable.

A particular object of the invention has been the provision of such a method and apparatus which are especially adapted to sealing gable-top plastic coated containers in such a way that the container can readily be opened and the pouring spout extended.

Another object of the invention has been the provision of such a method and apparatus which will inhibit or eliminate sealing or sticking of the spout rib panels, and especially the spout raw edge, to the roof panels during top closure of the container, thereby improving top opening quality of the container.

SUMMARY

The method of the invention is concerned with a container sealing operation in which a container formed from plastic coated paperboard is to have selected panels heated and forced together under pressure to effect a heat seal thereof, the selected panels including at least one raw edge. Sealing of selected portions of the selected panels including and adjacent to the raw edge is inhibited by wetting the raw edge and adjacent portions forming the selected portions with a wetting material to form a moisture film on the adjacent portions and to penetrate into the paperboard fibers of the raw edge. The selected panels are then heat sealed before there is substantial loss of moisture from the raw edge and adjacent portions.

The apparatus comprises an applicator box having an open bottom, a central cavity communicating with the open bottom and a closed top. The top has an opening communicating with the cavity. A liquid reservoir is connected to the cavity through a conduit. A porous, deformable applicator pad is retained in the open end of the box and projects downwardly therefrom, this pad filling the open bottom so that liquid can escape from the open bottom only through the pad. The system preferably is nonvented so that liquid will not be lost from the applicator pad unless the latter is deformed by contact with an object to be wet.

BRIEF DESCRIPTION OF THE DRAWING

The invention will now be described in greater detail with reference to the appended drawing in which:

FIG. 1 is a perspective view illustrating one side of a container blank showing the scoring lines and the inhibited or abhesive coated areas, the side illustrated in FIG. 1 being intended to be the outer surface of a set-up container;

FIG. 2 is a perspective view of the opposite side of the upper portion of the container blank of FIG. 1;

FIG. 3 is a perspective view illustrating one form of apparatus according to the invention positioned so as to operate on a set-up container blank in the practice of the method of the invention;

FIG. 4 is a top plan view of the applicator apparatus of FIG. 3 positioned as in FIG. 3 and having portions broken away to show the interior construction;

FIG. 5 is a cross-sectional view taken along the line 5—5 of FIG. 4;

DESCRIPTION OF THE PREFERRED EMBODIMENT

Figure 6:
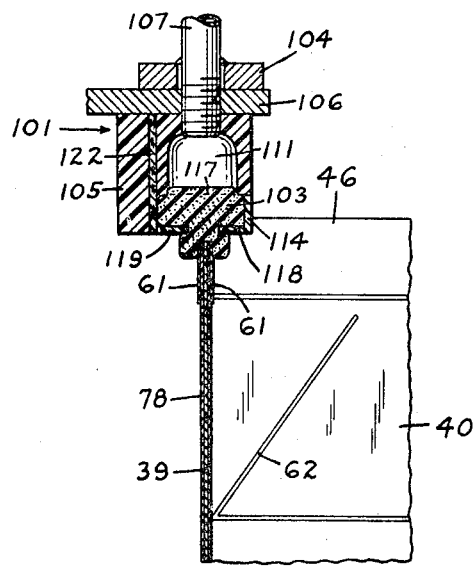
FIG. 6 is a cross-sectional view taken generally along the line 6—6 of FIG. 5.

Referring now to the drawings, and more particularly to FIGS. 1 and 2, the carton is formed from a blank 20, which is a single integral sheet of paperboard coated on both sides with polyethylene. The carton described below is essentially that of the Huang and Moors patent referred to above and repersents the construction in which the invention is expected to find its principal, but not exclusive, utility. The coated board is cut and scored so that when the carton is formed it assumes the shape of a rectangular container with a flat bottom and a gable top.

FIG. 1 represents that surface of the blank which will become the outside of the container, while FIG. 2 represents the upper portion of that surface which will become the inside of the container. A central portion 21 of the blank between transverse score lines 22 and 23 becomes the body of the container. Vertical score lines 24, 25, 26 and 27 divide the blank into a side panel 28, a front panel 29, a side panel 30, a rear panel 31, and a sealing panel or flap 32. Connected to and integral with the lower edges of panels 28–32 are bottom closure flaps 33, 34, 35, 36 and 37, respectively.

Integral with the upper ends of the panels 28–32 are top closure flaps 38, 39, 40, 41 and 42, respectively. Those portions of the flaps 38–42 beneath a transverse score line 43 define roof and end panels of the carton top closure, while the areas above the score line 43 form an upwardly extending central rib in the container when set up and sealed. Panels 38 and 40 become the gable roof panels, and projecting from these panels are panels 45 and 46, respectively, which form the sides of central rib 44.

Diagonal score lines 47 and 48 define fold-back panels 49 and 50 from panel 41. An upwardly projecting extension of panel 41 is divided by a vertical score line 52 into inner rib panels 53 and 54. Diagonal score lines 55 and 56 define fold-back panels 57 and 58 from panel 39. An upwardly projecting extension of panel 39 is divided by a vertical score line 59 into inner rib panels 60 and 61.

A diagonal score line 62 extending across panel 40 and partially across panel 46 and a diagonal score line 63 extending across panel 38 and partially across panel 45 are provided to facilitate spout opening, as is well known.

In forming the carton, a first step is to fold the blank lengthwise along the score lines 25 and 27 so that the outside (FIG. 1) surface of flaps 32, 37 and 42 underlie the outer edge of the inner surfaces of panels 31, 36 and 41, respectively. Prior to bringing these surfaces together, they should be heated to a polyethylene softening temperature, i.e., a temperature in the range of 250–600° F. In this way the side seam of the carton will be formed by a polyethylene-polyethylene heat seal, affording a liquid-tight seal. This operation will normally occur at the blank-forming plant, and the side-sealed blanks will be shipped to the dairy or other filling plant.

In accordance with the Huang and Moors patent referred to above, an abhesive coating is provided on selected polyethylene surface areas before the carton is heat-sealed. The coating may be applied by printing, brushing or other technique, but is preferably applied by printing during the blank-forming operation. If both the inside and outside surfaces of the blank are to be provided with abhesive coatings, the printing may be effected on both sides simultaneously, or first on one side and then the other. In general, the abhesive coating will be applied while the carton blank is being subjected to the usual printing operation which is conducted to provide the desired advertising matter on the carton.

The polyethylene coated paper comprises a relatively stiff paperboard sheet coated on each side with a layer of polyethylene. The paperboard might be, for example, 0.018 inch thick, the inner polyethylene layer might be, for example, 0.0011 inch thick, while the outer polyethylene layer might be, for example, 0.00075 inch thick. Selected areas of the polyethylene are supplied with an abhesive coating.

On the inner surface of the blank (FIG. 2) abhesive coatings 83, 84, 85 and 86 (shown as stippled areas) are applied to portions of panels 45, 61, 60 and 46, respectively. On the outer surface of the blank (FIG. 1), abhesive coatings 87 and 88 are applied to portions of panels 60 and 61. While it is considered preferable from a top-opening standpoint to provide the abhesive coatings 87 and 88 on the outer surfaces of the inner rib panels 60 and 61, as shown, these coatings may be, and often are, omitted.

The abhesive coatings 84, 85, 87 and 88 should extend from the tops of their respective panels to the bottom of score line 43. Abhesive coatings 84 and 88 should terminate a short distance from score line 25. Similarly, abhesive coatings 85 and 87 should terminate a short distance from score line 26.

Abhesive coatings 83 and 86 extend upwardly from the bottom of score line 43 to a maximum height such that the abhesive coatings are close to but spaced from the top edges of panels 45 and 46, respectively. This minimum spacing from the top edges is preferably between ³⁄₁₆" and ¼", and the lateral location of this minimum spacing from score lines 25 and 26, respectively, is equal approximately to the lateral length of the panels 60 and 61. The top edges of the coating areas 83 and 86 may be inclined downwardly from the point of minimum spacing toward the score lines 25 and 26, respectively, but at all points along these inclined edges the areas 83 and 86 extend above the corresponding points of areas 84 and 85, respectively, so that, when the carton top is heat-sealed, upper portions of abhesive areas 83 and 86 will overlie each other. These upper portions are above the top edges of the panels 60 and 61.

The top edges of the coating areas 83 and 86 are also inclined downwardly from the point of minimum spacing away from score lines 25 and 26, respectively, to correspond to the shape of the rear walls of the pouring spout when the carton is fully opened. In this way the carton may be opened and the spout formed without tearing the panels 45 and 46 except along the upper edges and adjacent the score lines 25 and 26. The spacing between abhesive areas 83 and 86 and score lines 25 and 26, respectively, should be the same as that between these score lines and the abhesive areas 84 and 85. The spacing between the abhesive areas 83 and 86 and score lines 24 and 27, respectively, is not critical and should be sufficient to permit spout formation without tearing along the rear edges of the areas 83 and 86.

Figure 7:
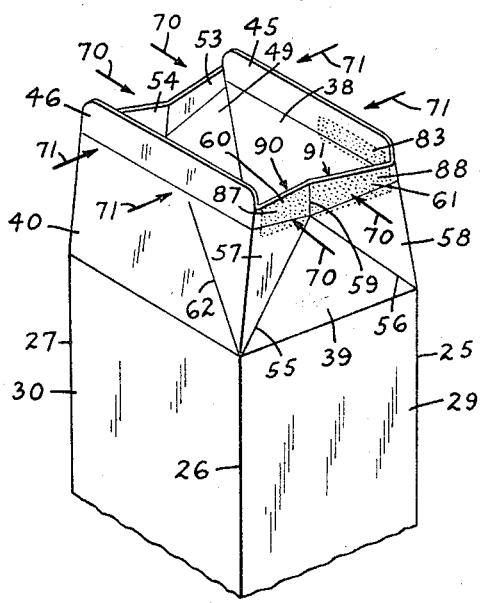
FIG. 7 is a perspective view illustrating the container filled and with the top partially closed.
Figure 8:
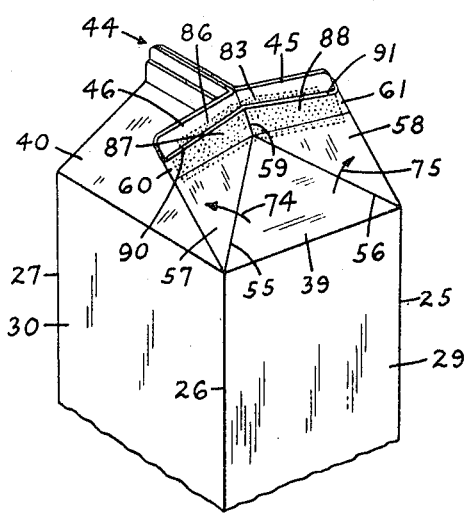
FIG. 8 is a perspective view illustrating the sealed container partially opened.
Figure 9:
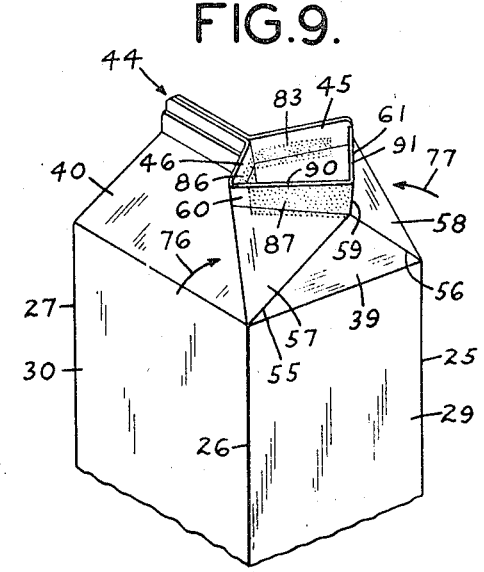
FIG. 9 is a perspective view illustrating the container fully opened with the pour spout extended.

The relationship between the various panels forming the container top is best shown in FIGS. 7, 8 and 9. In FIG. 7 the container top is shown in the process of being closed, the closing forces being indicated by the arrows 70 and 71. It will be noted that when the container top is completely closed, abhesive areas 87 and 88 will contact each other, abhesive areas 83 and 84 will contact each other, and abhesive areas 85 and 86 will contact each other. In FIG. 8 the container is shown partially opened, as by force exerted by the consumer along the arrows 74 and 75. In FIG. 9 the container is fully opened and the pouring spout is extended to permit pouring of the container contents.

The spout end rib panels 60 and 61 have raw edges 90 and 91, respectively, which are not coated with an abhesive material. These edges are formed in the die cutting operation in which blanks are cut out of a long web of polyethylene coated paper. As noted above, plowing pressures exerted on the top of the container during top closure tend to force the spout end rib panel raw edges into bonding contact with the gable roof side rib panels. Thus the edge 90 tends to stick to side rib panel 46 while the edge 91 tends to stick to side rib panel 45. In some cases the edges 90 and 91 may actually cut into the polyethylene coating on the inner surfaces of panels 45 and 46. Sticking of the end rib panel edges 90 and 91 and the adjacent side portions of the end rib panels 60 and 61 to the side rib panels is more likely to occur and to provide difficulty in top opening if the abhesive application is in any way faulty, as sometimes occurs in the high speed printing necessary for blank production, or if the top heater temperatures of the dairy filling and sealing machine are too high, as sometimes occurs even in carefully controlled dairy operations.

In accordance with the invention, sealing or sticking of the spout end rib panels, and especially their raw edges and adjacent surfaces, to the spout side rib panels is eliminated or greatly reduced by wetting or moistening the spout end rib panel raw edges 90 and 91 and adjacent portions of the end rib panels on both the inside and outside of the container. The wetting should be effective across the width of the raw edges 90 and 91 except for the portions near the adjacent side rib panels 46 and 45, respectively. The width of the portions not wet is preferably equal to the width of those portions of end rib panels 60 and 61 not covered by abhesive areas 85 and 84, respectively. Typically the abhesive areas, and hence also the wet areas, will extend to about ⅜" from the respective score lines 25 and 26 for a quart size container and to about ⅝" for a gallon size container.

The polyethylene, abhesive and paperboard along the raw edges 90 and 91 should all be wet, except adjacent score lines 25 and 26. The moisture should also penetrate into the paperboard itself by wicking action, preferably to a depth of about 1⁄32" to ⅛", and should coat the abhesive along the inside and outside surfaces of the end rib panels for a substantial height, e.g., ⅛" to ¼" or more. Where the abhesive is omitted from the outer surfaces of the end rib panels, which is the usual commercial construction, the polyethylene surface will be wet instead.

The wetting material should be one which will penetrate into the paperboard fibers at the raw edges and which will coat the adjacent abhesive or polyethylene surfaces. All or at least a major portion of the wetting material should be volatile at the heat sealing temperatures employed in effecting the container top seal. Usually heat sealing will be effected at 250° F. or above, but polyethylene can be heat sealed to polyethylene at temperatures as low as 215°–220° F.

The preferred wetting material is water containing a wetting agent which will facilitate water penetration into the paperboard fibers and which will form a film of water on the polyethylene and abhesive surfaces to which it is applied. Both anionic and nonionic wetting agents have been tested and found satisfactory in the practice of the invention.

Typical examples of suitable wetting materials are set forth in the following examples in which percentages are by volume:

| Example No. | Materials | Minimum, Percent | Maximum, Percent |
|---|---|---|---|
| 1 | Ethyl alcohol | 30 | 40 |
|   | Distilled water | 60 | 70 |
| 2 | Sodium lauryl sulfate (USP grade) | 0.5 | 2.0 |
|   | Distilled water | 98.0 | 99.5 |
| 3 | Aerosol OT (American Cyanamid) | 0.5 | 2.0 |
|   | Distilled water | 98.0 | 99.5 |
| 4 | Methocel 65HG (50 c.p.s.) (Dow Chemical) | 1.0 | 2.0 |
|   | Distilled water | 98.0 | 99.0 |
| 5 | Tween 80 (Atlas Chemical) | 1.0 | 2.0 |
|   | Distilled water | 98.0 | 99.0 |

While the use of a wetting agent is preferred in the practice of the invention, a thickening agent may be used to provide the coating of wetting material on the polyethylene and abhesive surfaces and to permit penetration of moisture into the paper fibers through the raw edges. Examples of such thickening agents usable with water are ethyl cellulose, carboxy methyl cellulose, gelatin, starch and the higher molecular weight Methocel formulations.

Where the container is intended to hold a food product it is, of course, important that the wetting materials be nontoxic. Such materials should be selected to conform to FDA and local health authority regulations.

The quantity of wetting material applied may be varied over a considerable range. The maximum quantity which may be applied is fixed by that quantity at which inadequate top sealing is achieved. In a typical container of the type illustrated in a one quart size, the raw adges 90 and 91 may each be 1⅜" long but only about 1" of each will be wet. The preferred quantity of wetting material for such a container has been found to be about 0.04 to 0.1 cc. per quart container. The 0.1 cc. quantity of wetting material referred to corresponds to about 3.12 cc. per square inch of raw edge surface.

It has been found preferable to apply the wetting material to the container just prior to the container top sealing operation. If any great delay occurs between the application of the wetting material and the top sealing operation, the loss of wetting material through evaporation or other causes will reduce the level of top opening improvement achieved. By way of example, a time lag of 25 seconds between application of the wetting material and entry of the container into the top heater which heats the polyethylene for top sealing was found to yield a good top opening quality. On the other hand, a time lag of 54 seconds during which the container was exposed to the bottom heaters which form the bottom seal was found to result in no noticeable top opening quality improvement, i.e., the wetting did not result in any improvement over a similar container with no wetting. It is not the time lag as such which results in poorer performance but rather exposure of the container over a period of time to conditions in which substantial wetting material is lost. Should it be desired to wet the container a substantial time before top sealing, some technique such as microencapsulation of the wetting material should be used to prevent loss of moisture.

A number of factors are believed to result in top opening quality improvement from the wetting of the end rib raw edges and adjacent areas. One of these factors is a cooling of the end rib panel raw edges by contact with a relatively cool liquid which must be heated to the boiling point during the polyethylene heat sealing operation. Another factor is the evaporation of volatile material, e.g., water, during the heat sealing operation and the consequent cooling of the surfaces from which the volatile material is evaporated. Still a further factor is the lubricating effect produced by moisture on the raw edge areas as these edges are forced into engagement with the side rib panels and by moisture on the adjacent surfaces of the end rib panels as they move into surface contact with the side rib panels.

It has been found that penetration of the liquid into the paperboard fibers is important in achieving good top opening improvement and that it is not satisfactory merely to coat the side surfaces of the end rib panels without also wetting the raw edges themselves and achieving penetration of liquid into the paperboard fibers.

In FIG. 3 there is shown the upper portion of a container 100 formed from a blank 20. The container 100 in FIG. 3 is assumed to have been set up and to have had the bottom seal formed. The setting up and bottom sealing may be effected in any of the well-known machines made for this purpose and which are installed and operating in dairies throughout the world. A typical machine of the type employed by dairies to set up, fill and seal plastic coated paperboard containers is shown and described in U.S. Pat. 3,120,089 to Monroe et al. issued Feb. 4, 1964.

The container 100 of FIG. 3 is shown in contact with a top wetting device indicated generally by the reference numeral 101. The device 101 is shown in greater detail in FIGS. 4–6 and comprises an applicator box 102, an applicator pad 103, a top plate 104, a face place 105, a supporting arm 106, a feed tube 107 and a reservoir 108 (FIG. 3).

The box 102 may be formed from a molded plastic and may be in one piece, two pieces or three pieces, as shown. The upper piece 109 of box 102 has a central cavity 111 which is rectangular in the cross section of FIG. 6 and trapezoidal in the cross section of FIG. 5. The top wall of the piece 109 has a central opening which accommodates the threaded end of tube 107 so that liquid from reservoir 108 will flow through tube 107 into cavity 111. The bottom of cavity 111 communicates with hollow lower piece 110 of box 102. The piece 110 has sidewalls 112, 113, and 114. The bottom wall of 116 of upper piece 109 around cavity 111 forms the top closure for bottom piece 110. The top edges of walls 112, 113, and 114 may be affixed abhesively to the bottom wall 116 of top piece 109. The wall 116 has an opening corresponding in size and shape to the open bottom of cavity 111. The wall 116 may be provided with an integral central stiffening bar portion 117 (FIG. 5). The side wall 114 is provided with inwardly extending bottom flange 118 (FIG. 6). A corresponding flange number 118 is provided at the other side of box 102. The flange number 119 may be abhesively affixed, as shown, to a cork gasket 122.

Approximately one-half of applicator pad 103, which is preferably a synthetic sponge, is accommodated in the opening of bottom piece 110. The remainder of pad 103 extends below the bottom of box 102. The pad 103 is preferably T-shaped in cross section and is slightly larger in length and width than the corresponding dimensions of the hollow opening of bottom piece 110 so that the pad must be compressed in both length and width to be fitted into that opening. Flanges 118 and 119 extend into the sides of pad 103, as best shown in FIG. 6, to form a narrow waist in the pad 103. By reason of the compression of pad 103 the top thereof may bow slightly and extend into cavity 111.

Top plate 104, which is spaced from applicator box 102 by arm 106, is attached to the top piece 109 of box 102 by machine screws 120 and 121 acting in openings in top plate 104 and threaded holes in top piece 109. Both top plate 104 and arm 106 have holes which accommodate tube 107. Both the top plate 104 and the arm 106 are preferably made of stiff metal, e.g., steel. Face plate 105, which is preferably plastic, is spaced from the side wall of applicator box 102 by cork gasket 122. Machine screws 123 and 124 which act in holes provided in face plate 105 and gasket 122 are threaded in holes provided in top piece 109 to hold face plate 105, flange member 119 and gasket 122 in place. With face plate 105, gasket 122 and flange member 119 removed, pad 103 is readily insertable in hollow bottom piece 110.

Arm 106 is attached to a suitable supporting member (not shown) on the container filler and sealing machine (not shown) or other machine with which the unit is associated so that at a preselected point in the motion of the container through the machine the panels 60 and 61 are brought into contact with the bottom surface of pad 103 and deform the pad in a substantially U-shaped cross section as shown in FIGS. 3 and 6. Deformation of the pad 103 may be effected by moving the top wetting device 101 into contact with a container or by moving the container into contact with the top wetting device. In either case the motion involved is preferably a reciprocating motion in a vertical direction.

One desirable place for locating the applicator device is adjacent the top breaker unit of the filling and sealing machine. The top breaker unit, as is well known in the art, acts to break the container top along its score lines so that the container top will be ready to be heat sealed. In the usual machine, after a container bottom is formed and sealed, the container is transferred to an indexing conveyor. At one point in the conveyor, termed the container locator section, as the top breaker unit moves downward to break the top of the container the container locator unit moves downwardly to position accurately the preceding container on the conveyor. By attaching the applicator device 102 to the container locator support arm and positioning the applicator device correctly, when the top breaker unit comes down to break a container, the preceding container on the conveyor will be contacted by the applicator unit, as shown in FIGS. 3–6. When the top breaker unit reciprocates upwardly after completion of top breaking, the applicator device likewise will reciprocate upwardly. The container with its wetted surfaces will then advance to the top breaker section where its top in turn will be broken. The container, with the wetted surfaces and broken top score lines then moves on to the filling section, the top heater and the sealer, as is well known in the art.

The pad 103 is preferably an artificial sponge, but may be a felt pad. Specific examples of satisfactory artificial sponges are 80 and 100 pores per lineal inch polyurethane foams having densities of 4 pounds per cubic foot.

The reservoir 108 should be located above the applicator pad so that the tubing 107 and cavity 108 are kept filled with the wetting liquid. The liquid will thus be in direct contact with the applicator pad and will saturate that pad. Since the liquid flow system is nonvented, no liquid will drip from the applicator pad. However, when the carton raw edge contacts the applicator pad, a volume of liquid will be transferred to the raw edge of the container lip (including adjacent side surface of the end rib panels). A volume of liquid equal to that transferred will, upon removal of the container, flow from the reservoir 108 to the pad 102.

When the container, with its wet raw edge, reaches the top heater section the top portions of the container are subjected to heat to soften the polyethylene in certain portions of the top of the container, as is well known in the art. However, heat reaching those portions which previously have been moistened, as described above, will be absorbed primarily by the wetting material and will be used in volatilizing the volatile portions of the wetting material. As a result the polyethylene and/or paperboard in such moistened areas will stay below the temperatures required to effect a polyethylene to polyethylene or polyethylene to paper seal. The wetting material also acts as a barrier between otherwise sealable surfaces, inhibiting sealing in such areas. By inhibiting polyethylene to polyethylene and/or polyethylene to paperboard seals, severe sticking or sealing of the spout end rib panels to the side rib panels is reduced or eliminated as the container passes through the top sealer section of the filling and sealing machine. Subsequent top opening of the container is thereby facilitated.

The top wetting, when combined with abhesive application, has been found to produce a superior container from a top opening standpoint, and is particularly useful in those cases where the abhesive coating, for one reason or another, is itself unable adequately to inhibit sealing.

The nonvented gravity feed applicator device illustrated in FIGS. 3-6 may be made a vented system, as by providing an opening in reservoir 108 for the entry of air. In such case a needle valve may be placed at some convenient point between the reservoir and the applicator pad to meter the flow of liquid to the pad so that it is equal to the volume of liquid removed by the container raw edge. Such a needle valve conveniently might be operated by contact with an edge of the container. More sophisticated feed systems such as a timed flow through a small orifice or intermittent use of a valve can also be used.

The invention has been described primarily in connection with a gable-top container having an extensible pouring spout since it is with that type of container that the principal utility of the inventon is presently anticipated. However, it should be understood that the invention will be found useful in other contexts. Hence, while the invention has been described primarily in connection with specific steps and in specific embodiments thereof, various modifications will occur to those skilled in the art without departing from the spirit and scope of the invention as set forth in the appended claims.

What is claimed is:

1. In a container sealing operation in which a container formed from plastic coated paperboard is to have selected panels heated and forced together under pressure to effect a heat seal of said selected panels, said selected panels including at least one raw edge, the method of inhibiting the sealing of selected portions of said selected panels, including and adjacent to said raw edge, comprising the steps of wetting said raw edge and adjacent portions forming said selected portions with a wetting material which forms a moisture film on said adjacent portions and penetrates into paperboard fibers in said raw edge, and then heat sealing said selected panels before there is substantial loss of said wetting material from said raw edge and said adjacent portions, surfaces of said selected panels including at least some of said selected portions being provided with an abhesive coating before application of said wetting material thereto.

2. In a container sealing operation in which a container formed from plastic coated paperboard is to have selected panels heated and forced together under pressure to effect a heat seal of said selected panels, said selected panels including at least one raw edge, the method of inhibiting the sealing of selected portions of said selected panels, including and adjacent to said raw edge, comprising the steps of wetting said raw edge and adjacent portions of said selected panels forming said selected portions with a wetting material at least a major portion of which is volatile at the temperature used to heat seal said plastic, said material including a wetting agent which promotes formation of a moisture film on said adjacent portions and penetration of said material into paperboard fibers in said raw edge, and then heat sealing said selected panels before there is substantial loss of said wetting material from said raw edge and said adjacent portions, surfaces of said selected panels including at least some of said selected portions being provided with an abhesive coating before application of said wetting material thereto.

3. The method set forth in claim 2 in which said wetting material is formed from a mixture of water and a nontoxic wetting agent.

4. In the method of sealing a gable-top container formed from a blank of paperboard having a polyethylene coating covering both surfaces thereof, said container having a top structure formed from a plurality of panels defined by score lines and including a pair of end rib panels and a pair of side rib panels, the end rib panels, when said container is sealed, being folded to lie against each other and to lie against the inner surface of a respective side rib panel, said end rib panels each having a raw edge adapted to contact the inner surface of a respective side rib panel at an intermediate point in the height of the latter, said rib panels being adapted to be sealed together to form a liquid tight seal by the application of heat and pressure thereto to bond together the contacting polyethylene covered surfaces thereof, the inner surfaces of said end rib panels having an abhesive coating except for a narrow strip along a line of juncture between each of said end rib panels and said respective side rib panels, the steps comprising:

(a) wetting said raw edges and adjacent inner and outer surface portions of said end rib panels except for a selected strip on each end rib panel including said narrow strip, said wetting being effected with a liquid wetting material at least a major portion of which is volatile and which includes a wetting agent which promotes formation of a moisture film on said adhesive coatings and penetration of said liquid into paperboard fibers of said raw edges; and (b) subjecting said top structure including said wet portions of said end rib panels to the application of heat and pressure to form a liquid tight container top closure by softening and bonding together contacting polyethylene surfaces of said top structure, said application of heat being effected before there is substantial loss of moisture from said raw edges and adjacent portions of said end rib panels.

5. The method set forth in claim 4 in which the quantity of said wetting material applied to said raw edges and adjacent surfaces of said end rib panels is of the order of 3.12 cc. per square inch of raw edge surface.

6. The method set forth in claim 4 in which the height of the wet surface portions of said end rib panels is of the order of ¼ inch.

7. The method set forth in claim 4 in which said liquid penetrates into said paperboard fibers to a depth lying in the range of about 1/32" to 1/8".

8. The method set forth in claim 4 comprising the additional steps performed after said wetting step but prior to said sealing step of:

(c) breaking the top portion of said container along score lines to facilitate formation of said top structure; and (d) filling said container with a liquid product.

References Cited

UNITED STATES PATENTS

| 2,186,124 | 1/1940 | Rash | 156—289 X |
| 3,002,328 | 10/1961 | Monroe et al. | 53—373 |
| 3,107,586 | 10/1963 | Ragan | 156—289 X |
| 3,303,761 | 2/1967 | Monroe et al. | 93—44.1 |
| 3,392,076 | 6/1968 | Vander Pals | 156—289 X |

FOREIGN PATENTS 650,267   10/1962   Canada.

THERON E. CONDON, Primary Examiner

R. L. SPRUILL, Assistant Examiner

U.S. Cl. X.R.

93—36, 44.1; 156—289; 53—39

PO-1050
(5/69)

UNITED STATES PATENT OFFICE
CERTIFICATE OF CORRECTION

Patent No. 3,525,194                    Dated August 25, 1970

Inventor(s) Moors et al.

It is certified that error appears in the above-identified patent and that said Letters Patent are hereby corrected as shown below:

Col. 3, line 40, "repersents" should read -- represents --;

5, line 68, "surface" should read -- surfaces --;

6, line 42, "adges" should read -- edges --;

10, line 31, "adhesive" should read -- abhesive --;

line 66, "6/1968" should read -- 7/1968 --.

SIGNED AND
SEALED
NOV 10 1970

(SEAL)
Attest:

Edward M. Fletcher, Jr.
Attesting Officer

WILLIAM E. SCHUYLER, JR.
Commissioner of Patents